Aug. 13, 1968  H. F. SCHAEFER ET AL  3,397,068
METHOD OF PACKAGING FRESH MEAT
Filed June 21, 1966
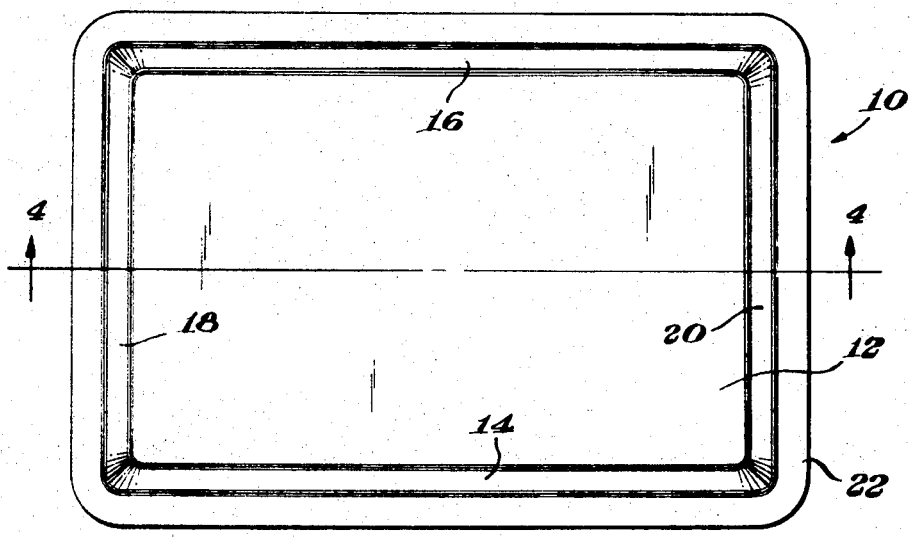
Fig. 1
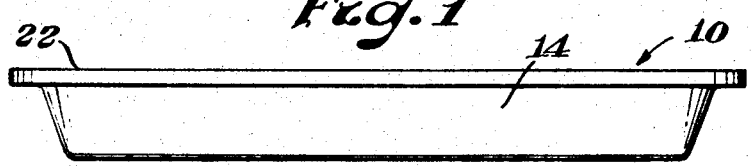
Fig. 2
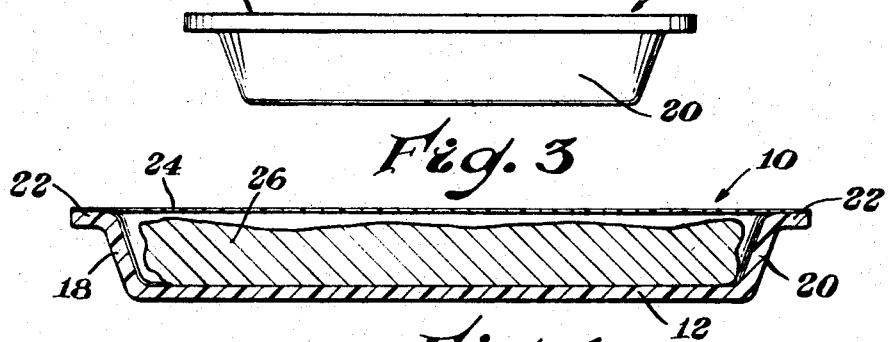
Fig. 3
Fig. 4
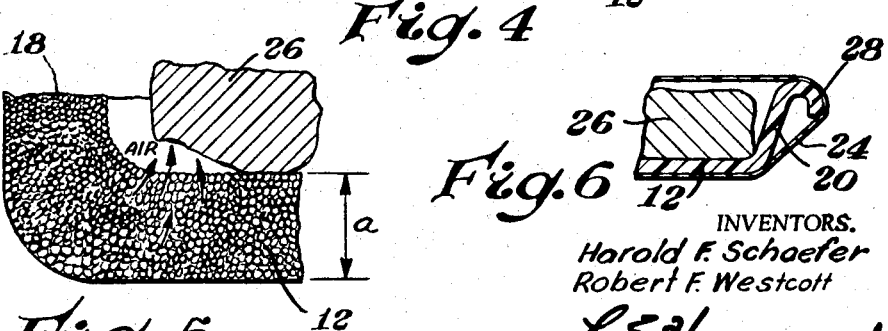
Fig. 5
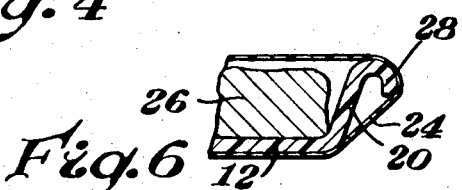
Fig. 6
INVENTORS.
Harold F. Schaefer
Robert F. Westcott
ATTORNEY

United States Patent Office 3,397,068
Patented Aug. 13, 1968

3,397,068
METHOD OF PACKAGING FRESH MEAT
Harold F. Schaefer, Concord, Calif., and Robert F. Westcott, Findlay, Ohio, assignors to The Dow Chemical Company, Midland, Mich., a corporation of Delaware
Continuation-in-part of application Ser. No. 323,316, Nov. 13, 1963. This application June 21, 1966, Ser. No. 567,795
2 Claims. (Cl. 99—174)

ABSTRACT OF THE DISCLOSURE

A plastic foam meat tray having a generally flat bottom wherein the cellular structure permits sufficient air inside the tray to come in contact with all surfaces of the meat product contained therein, even with the meat resting on the bottom, to maintain the red meat bloom for extended periods of time under normal conditions of refrigeration. Such cellular structure also permits many meat products to be readily strippable from the flat bottom of the tray.

---

This application is a continuation-in-part of application Serial No. 323,316 filed November 13, 1963, now abandoned.

This invention relates generally to an improvement in the packaging of fresh meats and, more particularly, to a novel tray structure of an expanded plastic material for preventing meat discoloration over a relatively long period of time.

Previous attempts to employ plastic trays for meat handling have not been completely satisfactory in preventing meat discoloration over comparably long periods of time under conditions of normal refrigeration. Discoloration of meat by a brown pigment, commonly referred to as metamyoglobin, has been a problem especially in the display of such products in self-serve markets where they are left to stand for long periods of time for customer selection. Fresh meats initially have a purplish-red pigment, myoglobin, which, it is believed, is converted to the bridge red oxymyoglobin by complexing with molecular oxygen. However, long continued oxidation of the myoglobin and the oxymyoglobin results in the discoloring brown pigment metamyoglobin, the relative proportions of the different forms of pigments being dependent upon the partial pressure of oxygen. Thus, too great a contact with oxygen results in a quickening of the discoloration of meat products.

It has also been discovered that a rapid discoloration of the meat takes place in products which come in contact with the plastic material in plastic sheet type trays, probably due to a complete lack of oxygen at these places of direct contact. There thus seems to be a balance whereby only a limited quantity, but some, of oxygen need be present. Thus, in the past plastic sheet type trays have generally had to be complicated by a rib structure, such as shown in U.S. Patent Des. 194,334, to prevent substantial contact between the tray and meat, and, even then, deterioration by contact was only minimized rather than totally eliminated.

Accordingly, it is an object of the present invention to provide foamed plastic trays minimizing the brown pigment discoloration tendency of meats contained therein.

A further object of the present invention is to provide a novel tray for supporting meat with a minimum of brown pigment discoloration without requiring ribs or other projections formed on the bottom thereof.

A still further object of the present invention is to provide a plastic foam meat tray permitting adequate amounts of air even about surfaces of the meat product resting on the bottom of tray.

Yet another object of the present invention is to provide a relatively inexpensive meat tray which maintains meat bloom for a substantial period of time.

Still another object of the present invention is to provide a novel meat tray which permits many frozen meats to be stripped substantially thereof without tearing part of the tray.

Briefly then, the present invention relates to a plastic foam meat tray using a flat bottom wherein the cellular structure permits sufficient air to come in contact with all surfaces of the meat product contained therein, even with the meat resting on the bottom, inside of the tray, to maintain the red pigment oxymyoglobin for extended periods of time under normal conditions of refrigeration. Such cellular structure also permits many meat products to be readily strippable from the flat bottom of the tray. Advantageous structural features, such as tray lip configurations, are also included as falling within the scope of the present invention.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, in which:

FIGURE 1 is a top plan view of a plastic foam meat tray constructed according to the principles of the present invention;

FIGURE 2 is a front elevational view thereof;

FIGURE 3 is a side elevational view thereof;

FIGURE 4 is a cross-sectional view thereof taken along reference line 4—4 of FIGURE 1 and including a meat product and plastic overlay;

FIGURE 5 is an enlarged fragmentary corner portion of FIGURE 4; and

FIGURE 6 is a fragmentary cross-sectional view of a modified tray structure.

Referring now more particularly to FIGURES 1 to 4, a novel plastic foam tray 10 of the present invention preferably includes a flat bottom wall 12, inclined opposite front and rear walls 14 and 16, respectively, and inclined opposite side walls 18 and 20. An outwardly extending strengthening lip portion 22 is illustrated as surrounding the upper periphery of the side walls, this providing a surface for the heat sealing of a plastic film overlay 24, if it is desired, which can thus be attached to the top of the tray rather than completely around the tray. Lip 22 also provides for ease of handling of the tray 10. Preferably tray 10 is vacuum formed out of a polystyrene foam sheet, although other materials, such as polyethylene foam sheet, may also be satisfactory.

The bottom and sides can be of a uniform cross section, if desired, or the side walls can be made thinner for more compact stacking.

Referring now more particularly to FIGURE 5, there is illustrated what is believed to be the unique characteristics of expanded plastics in meat product applications. There is reason to think that the present discovery results partially at least from the fact that a portion of the oxygen which maintains the meat bloom comes from air contained within the foam cells themselves. The use of pentane gas is one common method of expanding plastic cells. Once the cell is formed it is then frozen by lowering the temperature. As the gas escapes from the cells, a partial vacuum apparently is created. Atmospheric pressure thus fills the cells with air. The gradual release of this residual air in a meat package formed of a covered foam tray thus aids substantially in providing the necessary oxygen for meat color retention.

When the foam is thin enough, i.e., when the "a" dimension is not too great, there is the possibility that air may also diffuse through the foam because the accumulative thickness of the cell walls is not substantial and/or that the cell walls may have minute cracks permitting air entrance. Other air might also enter the package through the film overlay if it is air permeable, such as polyethylene film, rather than of a film like saran which is substantially air impervious.

For example, a meat tray can be made of an expanded polystyrene plastic body having an average cell size, in the plane direction of the bottom, of about 230 microns, a relatively low density of about 2.62 pounds per cubic foot (that is, of about two and one-half pounds per cubic foot) and a thickness of approximately 150 mils. Such a tray was found to perform exceptionally well and was tested as a 9 inch by 11 inch container.

It has also been discovered that the meat tray typically exemplified above permits meats, such as beef steaks and pork chops for example, to be stripped from the tray with little or no adhesion between the meat and tray after being removed from its freezing environment for only a very few minutes.

A modified lip arrangement for a tray is illustrated in FIGURE 6. Here a turned down lip 28 extends about the periphery of walls 14, 16, 18 and 20 to a point lower than their upper periphery. This leaves only solid material, rather than a raw cut edge, at the top of the container at the point of highest stress. Since raw cut edges are extremely notch sensitive, lip 28 provides a means of preventing what might otherwise be tray failures. Overlay 24 is illustrated as lapping over lip 28 and under bottom wall 12 for heat sealing.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A method of packaging fresh meat comprising placing a fresh meat product in a tray formed entirely of a relatively low density plastic foam material, said tray having a bottom wall and a side wall therearound, said walls having a thickness of approximately 150 mils, the average cell size in the plane direction of the inside of the bottom wall being of such size as to permit ready stripping of the fresh meat from the tray with substantially full separation of the fresh meat from the inside of said bottom wall, and sealing said fresh meat product within said tray by securing a plastic film overlay about the periphery of said tray, whereby at least the residual air in the cells of the expanded plastic material serves to maintain the meat bloom for a substantial period of time under normal conditions of refrigeration.

2. The method of claim 1 wherein the average cell size in the plane direction of the inside of the bottom wall is about 230 microns.

References Cited

UNITED STATES PATENTS

| 2,256,483 | 9/1941 | Johnston. | |
| 2,859,122 | 11/1958 | Maturi et al. | 99—174 |
| 2,893,877 | 7/1959 | Nickolls | 99—174 |
| 3,185,371 | 5/1965 | Reifers | 229—2.5 |
| 3,264,120 | 8/1966 | Westcott | 229—2.5 X |

FOREIGN PATENTS 837,923  6/1960  Great Britain.

OTHER REFERENCES

"Modern Plastics," April 1960, pp. 100, 101 and 176.

HYMAN LORD, *Primary Examiner.*